United States Patent
Sinivaara et al.

(10) Patent No.: US 7,058,401 B1
(45) Date of Patent: Jun. 6, 2006

(54) VEHICLE TELEPHONE SYSTEM

(75) Inventors: Hasse Sinivaara, Espoo (FI); Markku Rautiola, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/937,044

(22) PCT Filed: Mar. 23, 2000

(86) PCT No.: PCT/IB00/00409

§ 371 (c)(1),
(2), (4) Date: Jan. 8, 2002

(87) PCT Pub. No.: WO00/57578

PCT Pub. Date: Sep. 28, 2000

(30) Foreign Application Priority Data

Mar. 23, 1999 (GB) .................................. 9906746.4

(51) Int. Cl.
*H04Q 7/22* (2006.01)
(52) U.S. Cl. ...................... 455/431; 455/430; 455/445; 455/433; 455/12.1
(58) Field of Classification Search ................. 455/431, 455/427, 550, 557, 348, 346, 351, 430, 445, 455/433, 12.1, 13.1; 340/988, 989
See application file for complete search history.

(56) References Cited

U.S. PATENT DOCUMENTS

| | | | | |
|---|---|---|---|---|
| 5,634,209 A | * | 5/1997 | Prudhomme et al. | 455/345 |
| 5,865,503 A | * | 2/1999 | Shields, Jr. | 297/188.14 |
| 5,950,129 A | * | 9/1999 | Schmid et al. | 455/431 |
| 5,963,877 A | * | 10/1999 | Kobayashi | 455/567 |
| 5,973,722 A | * | 10/1999 | Wakai et al. | 725/76 |
| 6,598,227 B1 | * | 7/2003 | Berry et al. | 725/77 |
| 2002/0047787 A1 | * | 4/2002 | Mikkola et al. | 340/995 |
| 2002/0123344 A1 | * | 9/2002 | Criqui et al. | 455/431 |
| 2003/0208764 A1 | * | 11/2003 | Galipeau et al. | 725/76 |

FOREIGN PATENT DOCUMENTS

| | | |
|---|---|---|
| EP | 0 828 354 | 3/1998 |
| GB | 2310973 | 9/1997 |
| GB | 2310973 A * | 9/1997 |
| WO | WO 94 28684 | 12/1994 |

OTHER PUBLICATIONS

The Provision of GSM Cellular Radio Environments Within Passenger Aircraft Operating Over Europe by I. E. Casewell, International Conference 5th. Mobile Radio & Personal Communications, Dec. 11-14, 1989, Coventry, GB, 1989, pp. 172-176, XP000783796.

* cited by examiner

*Primary Examiner*—Joseph Feild
*Assistant Examiner*—Julio Perez
(74) *Attorney, Agent, or Firm*—Lackenbach Siegel LLP

(57) ABSTRACT

A telephone system for a vehicle comprising: a vehicle transceiver, on board said vehicle, and connectable to a cellular telephone network for bi-directional communication therewith; a server terminal, on board said vehicle, connected to said transceiver and having an identification address; a plurality of user terminals, distributed on board the vehicle, each capable of accepting an identity of a user of the cellular telephone system and each connected to said server terminal whereby a plurality of users may communicate simultaneously with said network via the server terminal; and a location data base for identifying users of the cellular telephone system when their identifies are accepted by respective user terminals and for associating those users with said identification address to permit communication to be established between those users and the cellular telephone system via the server terminal.

21 Claims, 3 Drawing Sheets

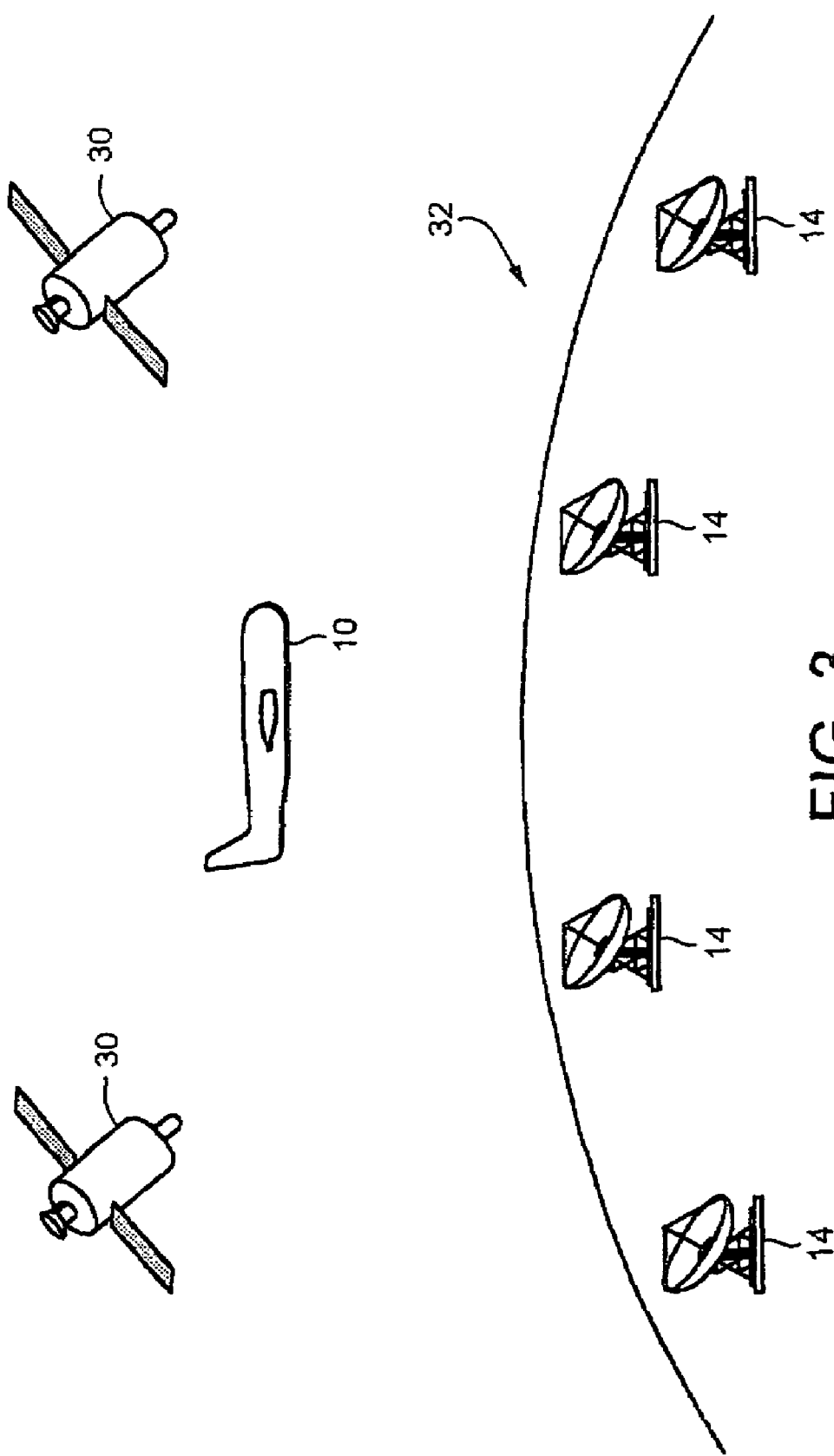

VEHICLE TELEPHONE SYSTEM

The present invention relates to a telephone system for use in a vehicle, which is applicable to cellular telephone systems such as GSM or DCS cellular systems and U.S. standard systems.

It is known that RF mobile telephones using cellular networks are not generally used in aircraft due to the belief that there is the possibility of interference with aircraft equipment.

It is also known that generally only fixed line systems are installed into aircraft. These fixed line systems are capacity limited so that the number of calls to and from an aircraft at any one time is limited to a few simultaneous calls.

Furthermore as any vehicle which has a satellite communication system, as the vehicle moves from a region of coverage provided by one satellite to that of another all calls must be individually "handed over". This can lead to calls being dropped.

It is an object of the present invention to at least partly mitigate the above problems.

According to the present invention there is provided a telephone system for a vehicle comprising a vehicle transceiver, on board said vehicle, and connectable to a cellular telephone network for bi-directional communication therewith, a server terminal, on board said vehicle, connected to said transceiver and having an identification address, a plurality of user terminals, distributed on board the vehicle, each capable of accepting an identity of a user of the cellular telephone system and each connected to said server terminal whereby a plurality of users may communicate simultaneously with said network via the server terminal, and a location data base for identifying users of the cellular telephone system when their identifies are accepted by respective user terminals and for associating those users with said identification address to permit communication to be established between those users and the cellular telephone system via the server terminal.

Preferably the telephone system further comprises a plurality of interface systems each for providing a communication path between said transceiver and a switching network within a respective region, the switching network being connected to said telephone network and connectable to at least one of said interface systems when the vehicle is located in the region corresponding to that interface system thereby providing a communication path between said transceiver and said telephone network, and control apparatus operable to select which one of said interface systems should provide the communication path to the transceiver when the vehicle is located in the regions corresponding to a plurality of interface systems.

Conveniently the location data base is connected to said telephone network and is accessible to enable said network to locate each of said accepted users and thereby enable bi-directional communication between said telephone network and each of said identified users.

Advantageously the control apparatus is further operable to control simultaneously the handover of said established communication when the vehicle moves from a first one of said regions to a second one of said regions.

According to the present invention there is also provided a method of operating a telephone system within a vehicle to enable a plurality of users to simultaneously communicate with a ground based cellular telephone system, which method comprises establishing a fixed connection through a plurality of user terminals distributed on board the vehicle to a server terminal having an identification address, establishing a connection between said server terminal and an onboard transceiver, identifying users of the cellular telephone system when their identities are accepted by respective user terminals, and associating identified users with said identification address to permit simultaneous communication to be established between those users and the cellular telephone system via the server terminal.

The vehicle may suitably be an aircraft, train or boat.

An embodiment of the invention will now be described hereinafter by way of example only and with reference to the accompanying drawings in which.

Figure 1:
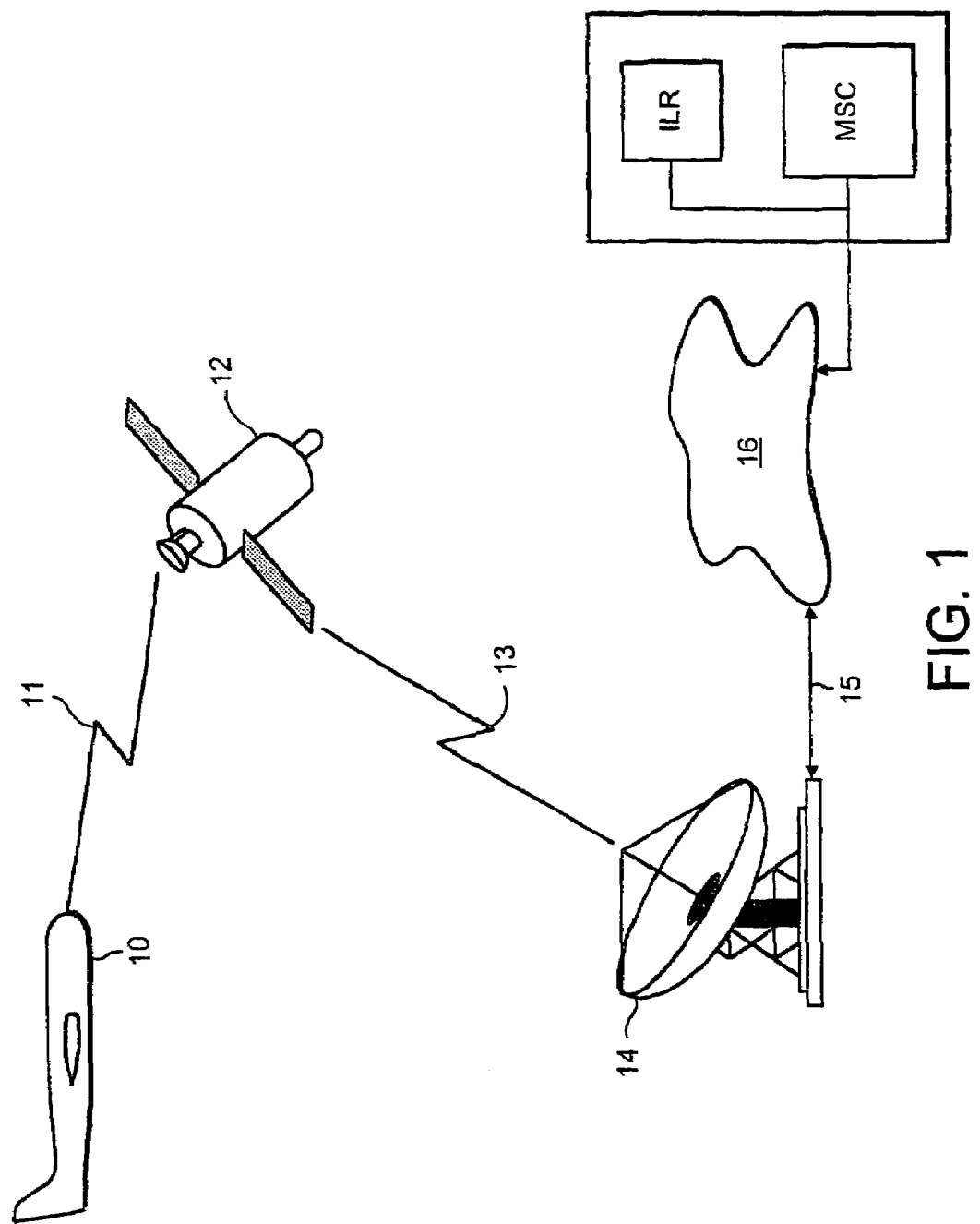
FIG. 1 is a schematic view of a telephone communication system.

FIG. 3 schematically shows the aircraft in transit.

In the drawings like reference numerals refer to like parts.

The telephone system of this example enables subscribers to a cellular mobile telephone system to use telephones within an aircraft without causing interference with the aircraft equipment. The system is particularly applicable to subscribers to a known GSM/DCS network in which the user has a SIM card which the user may locate in a receptor in a phone to use the services available to him. The system may however be used with any mobile telephone system.

In the general scheme shown in FIG. 1 a plurality of users within an aircraft 10 are able to transmit or receive telephone messages through a transceiver located within the aircraft 10 which communicates via a satellite 12 to a ground earth station 14 using standard E1-link (CEPT E1) links 11 and 13. The ground earth station communicates through an internet protocol (IP) (WAN=Wide Area Network) to a mobile switching centre (MSC) linked to a public service telephone network (PSTN). The operation of the mobile switching centre, ground earth station 14, and public switching telephone network are conventional in established cellular telephone networks.

The IP system 16 is integrated into the conventional cellular network topology as one part of the network structure. It is one alternative medium to link the mobile traffic from one location to another. At GES the GI signal is converted into IP traffic.

Figure 2:
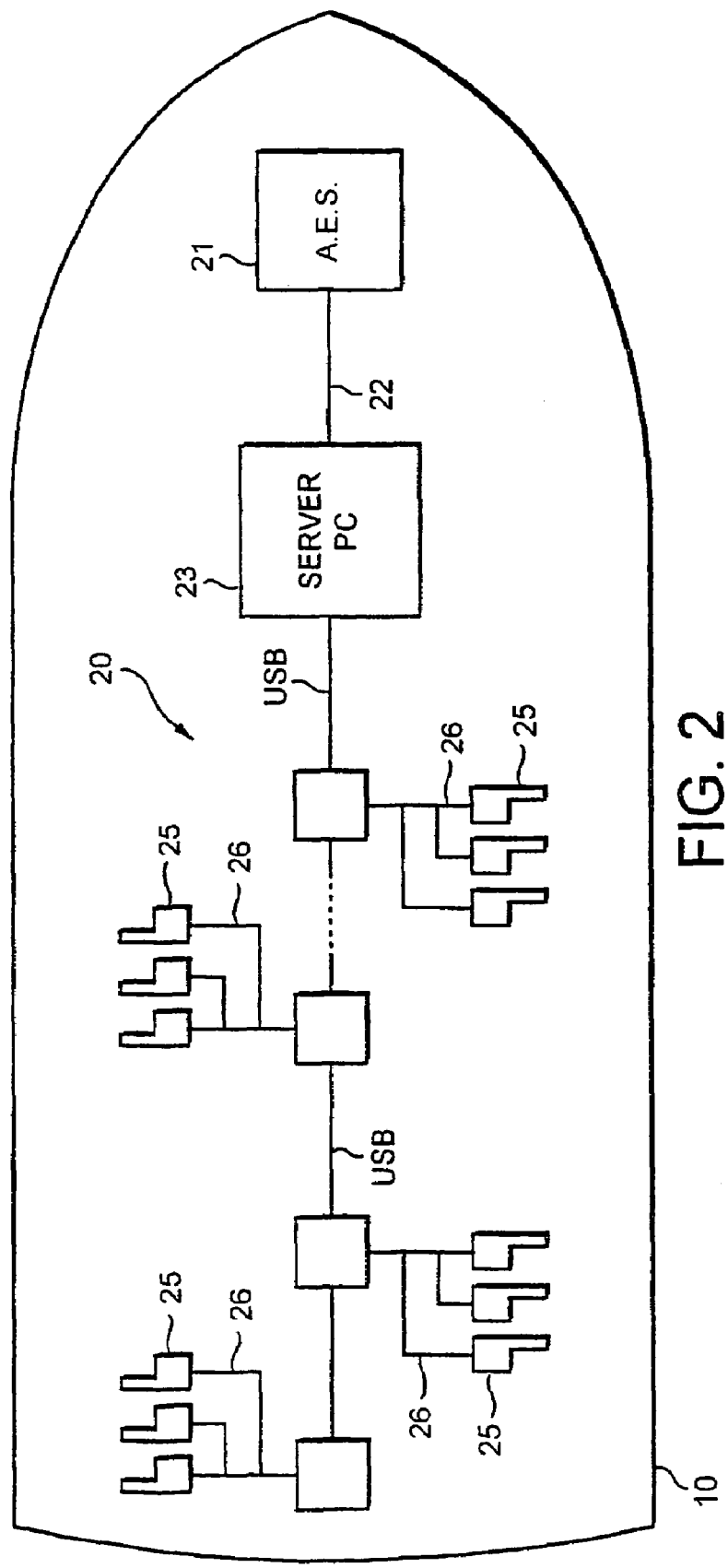
FIG. 2 is a schematic view of the vehicle telephone systems.

FIG. 2 illustrates the aircraft telephone system 20 in more detail. The transmission and receipt of telephone message to and from the aircraft 10 are handled by a transceiver which in the example is an aeronautical earth station (AES). The aeronautical earth station communicates with a satellite 12 via E1 link 11 in a conventional way.

The aeronautical earth station is connected to a server terminal 23 such as a PC server terminal via a fixed connection 22 which may be a CEPT-E1 2 Mbit fixed connection.

The PC has software which controls the mobile telephones 25 which are distributed throughout the aircraft 10. Each mobile telephone (or user terminal) is connected via a fixed connection 26 such as an RS-232 serial bus or universal serial bus (USB). The actual RS-232/USB network can be built by using twisted pair, fibre links or tiered star connections.

By connecting the user terminals to the server PC and transceiver 21 via fixed links RF interference is avoided. In order to ensure that no RF interference is created aircraft mobiles are provided which are permanently connected via connector 26 to the USB and which have no GSM RF emitting antenna. Passengers put their own SIM cards or other identifier in a receptor in the phone.

By inserting the SIM card into the aircraft mobile or by connecting the user's own mobile the user indicates when he wishes to use the telephone system so that he is identified by his own telephone number. This enables the user to be contacted in the aircraft and to utilise the services which are normally available and also allows the user to be identified for billing.

The mobile telephones 25 are connected into an Intranet cluster in the aircraft mobile network. When a user places his SIM card into the aircraft mobile telephone 25, or the telephone is connected to the transceiver via the PC server terminal and can thereby communicate with the ground based telephone network via satellite link. The mobile switching centre which is part of the telephone network is updated with the SIM identity. The cellular network thereafter identifies that that the user is in the aircraft.

The server PC 23 has its own identification address which is equivalent to the address stored in the visitor location register (VLR) database in a conventional mobile switching centre (MSC). The database could be in any suitable form and stored at any suitable unit; in this example it is stored in an Intranet location register (ILR) database. The Intranet location register database is updated when the SIM card is replaced by a user in the aircraft so that the mobile has a new location area code (LAC). Each aircraft mobile network (AMNW) forms one location area and users in the aircraft are always associated with that area code when connected in the aircraft.

The provision of an Intranet mobile cluster whereby a plurality of users are associated with a single IP address allows the handover of calls to be carried out more conveniently. For example and with reference to FIG. 3 the Inmarsat satellite system has at least three satellites 30 in orbit each of which covers a certain region or area over the globe 32. One handover area is above the Norwegian sea. As an aircraft moves from one region to another calls currently being made on board the aircraft must be handed over from one satellite and its associated ground earth station 14 to the next satellite and its associated ground earth station. The new routing ground earth station therefore has to be selected in accordance with the position of the aircraft. The telephone system therefore selects which one of the satellites and ground earth stations should provide the communication path to the transceiver when the aircraft is located in regions corresponding to more than one satellite to provide the strongest signal. As the aircraft moves from one region to another the IP address of the aeronautical mobile network remains the same. This minimises the chance that the short satellite link timeout, which affects calls to and from the aircraft, results in calls being dropped.

It will be appreciated that the use of the fixed connection in the aircraft telephone system prevents interference with the aircraft equipment. Furthermore the use of the described aircraft telephone system allows many users to make simultaneous calls to or from the aircraft.

The invention is not limited to the details of the foregoing example.

The invention claimed is:

1. A telephone system for a vehicle comprising:
a vehicle transceiver, on board said vehicle, and connectable to a cellular telephone network for bi-directional communication therewith;
a server terminal, on board said vehicle, connected to said transceiver and having an identification address;
a plurality of user terminals, distributed on board the vehicle, each capable of accepting an identity of a user of the cellular telephone system and each connected to said server terminal whereby a plurality of users may communicate simultaneously with said network via the server terminal;
a location data base for identifying users of the cellular telephone system when their identifies are accepted by respective user terminals and for associating those users with said identification address to permit communication to be established between those users and the cellular telephone system via the server terminal;
a plurality of interface systems each for providing a communication path between said transceiver and a switching network within a respective region, the switching network being connected to said telephone network and connectable to at least one of said interface systems when the vehicle is located in the region corresponding to that interface system thereby providing a communication path between said transceiver and said telephone network; and
control apparatus operable to select which one of said interface systems should provide the communication path to the transceiver when the vehicle is located in the regions corresponding to a plurality of interface systems, the control apparatus being further operable to control simultaneously the handover of said established communication when the vehicle moves from a first one of the said regions to a second one of said regions, wherein said identification address remains unaltered as said vehicle moves from said first to said second respective regions.

2. A telephone system according to claim 1 in which said location data base is connected to said telephone network and is accessible to enable said network to locate each of said accepted users and thereby enable bi-directional communication between said telephone network and each of said identified users.

3. A telephone system according to claim 1 wherein said telephone system allows bi-directional communication between each user terminal in said vehicle and said telephone network.

4. A telephone system according to claim 1 wherein each said interface system comprises a server satellite and at least one associated ground earth station.

5. A telephone system according to claim 1 wherein said vehicle transceiver comprises a aeronautical earth station for bi-directional communication via satellite to a ground earth station which is connectable to the telephone network.

6. A telephone system according to claim 1 wherein said location database is stored in a mobile switching centre.

7. A telephone system according to claim 1 wherein said user terminal is connected to said server terminal via a first fixed connection and said server terminal is connected to said vehicle transceiver via a second fixed connection.

8. A telephone system according to claim 7 wherein said first fixed connection is RS-232 serial bus or USB.

9. A telephone system according to claim 7 wherein said first fixed connection is a universal serial bus (USB).

10. A telephone system according to claim 7 wherein said second fixed connection is a CEPT-E 1 connection.

11. A telephone system according to claim 1 wherein said user terminal comprises a cellular phone unit provided with an identification receptor for a subscription identifier of a user of the cellular telephone system.

12. A telephone system according to claim 11 in which the identifier is a SIM card or Smart Card.

13. A telephone system according to claim 1 wherein said user terminal comprises a phone receptor for receiving a user cellular phone.

14. A telephone system according to claim 13 wherein said user cellular phone is adapted to deactivate radio transmission by the cellular phone when said cellular phone is connected to said phone receptor.

15. A telephone system according to claim 1 wherein said server terminal comprises a personal computer (PC).

16. A telephone system according to claim 1 wherein said location database identifies which user of the cellular telephone system is connected to a user terminal by a subscription identifier.

17. A telephone system according to claim 1 wherein said switching network and control apparatus comprise an internet network.

18. A telephone system according to claim 17 wherein said location database is an Intranet location register.

19. A telephone system according to claim 1 wherein the vehicles is an aircraft.

20. A method of operating a telephone system within a vehicle to enable a plurality of users to simultaneously communicate with a ground base cellular telephone system, which method comprises:

establishing a fixed connection through a plurality of user terminals distributed on board the vehicle to a server terminal having an identification address;

establishing a connection between said server terminal and an onboard transceiver;

identifying users of the cellular telephone system wherein their identifies are accepted by respective user terminals;

associating identified users with said identification address to permit simultaneous communication to be established between those users and the cellular telephone system via the server terminal;

establishing a communication path between said transceiver and a switching network via a satellite and associated ground station when said vehicle is in a respective region wherein said switching network is connected to said cellular telephone system;

selecting which satellite should provide a communication path to the transceiver when the vehicle is located in a region corresponding to a plurality of satellites; and controlling simultaneously the handover of said established connection when the vehicle moves from a first one of said respective regions to a second one of said respective regions, wherein said identification address remains unaltered as said vehicle moves from said first to said second respective regions.

21. A method according to claim 20, wherein the vehicle is an aircraft.

* * * * *